United States Patent
Segev et al.

(10) Patent No.: US 9,001,806 B2
(45) Date of Patent: Apr. 7, 2015

(54) METHOD AND APPARATUS FOR MANAGING A PROBE RESPONSE RELATED TO WIRELESS MEDIUM ACCESS CONTROL

(71) Applicants: Jonathan Segev, Tel Mond (IL); Adrian Stephens, Cambridge (GB)

(72) Inventors: Jonathan Segev, Tel Mond (IL); Adrian Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 281 days.

(21) Appl. No.: 13/686,523

(22) Filed: Nov. 27, 2012

(65) Prior Publication Data

US 2013/0235852 A1    Sep. 12, 2013

Related U.S. Application Data

(60) Provisional application No. 61/607,235, filed on Mar. 6, 2012.

(51) Int. Cl.
| | |
|---|---|
| *H04W 72/04* | (2009.01) |
| *H04W 48/12* | (2009.01) |
| *H04W 72/12* | (2009.01) |
| *H04W 88/08* | (2009.01) |

(52) U.S. Cl.
CPC .......... *H04W 72/042* (2013.01); *H04W 72/044* (2013.01); *H04W 48/12* (2013.01); *H04W 72/12* (2013.01); *H04W 72/1284* (2013.01); *H04W 88/08* (2013.01); *Y02B 60/50* (2013.01)

(58) Field of Classification Search
CPC . H04W 72/042; H04W 72/044; H04W 72/12; H04W 72/1284; H04W 48/12; H04W 88/08; Y02B 60/50
See application file for complete search history.

(56) References Cited

U.S. PATENT DOCUMENTS

| | | | |
|---|---|---|---|
| 2006/0256742 A1* | 11/2006 | Lee et al. ..................... 370/278 |
| 2009/0005063 A1* | 1/2009 | Malik et al. ................ 455/456.1 |
| 2010/0177756 A1* | 7/2010 | Choi et al. ................... 370/338 |
| 2011/0161697 A1* | 6/2011 | Qi et al. ...................... 713/320 |
| 2012/0213110 A1* | 8/2012 | Yamaguchi ................. 370/252 |
| 2013/0232253 A1* | 9/2013 | Elhaddad et al. ........... 709/224 |

* cited by examiner

*Primary Examiner* — Paul H Masur
(74) *Attorney, Agent, or Firm* — Prass LLP; E. Ramirez

(57) ABSTRACT

An approach is provided for managing a probe response related to wireless medium access control. The approach involves causing, at least in part, an active scan process that includes transmitting one or more probe request messages to indicate one or more scheduling windows within which receiving one or more probe response messages is permitted in reply to the one or more probe request messages.

27 Claims, 7 Drawing Sheets

METHOD AND APPARATUS FOR MANAGING A PROBE RESPONSE RELATED TO WIRELESS MEDIUM ACCESS CONTROL

RELATED APPLICATIONS

This application claims the benefit of the earlier filing date of U.S. Provisional Application Ser. No. 61/607,235 filed Mar. 6, 2012, entitled "Techniques for Fast Initial Link Setup," the entirety of which is incorporated herein by reference, under 35 U.S.C. §119(e).

BACKGROUND

Service providers and device manufacturers (e.g., wireless, cellular, etc.) are continually challenged to deliver value and convenience to consumers by, for example, providing compelling network services. Wireless networks, such as those specified by various IEEE 802.11 standards (e.g., IEEE 802.11 standard, published Jun. 12, 2007, and beyond), for example, employ links between devices to communicate information. Procedures involving the initial setup of these links are important to such wireless networks.

Mobile devices often transmit probe request messages in search of wireless network access points with which the mobile device may communicate. Wireless network access points that receive a probe request message may process the probe request message, generate a probe response message in reply to the probe request message, and transmit the probe response message to the requesting mobile device. The time that it takes for a probe response message to be received by a mobile device varies. Accordingly, conventional requesting mobile devices often remain ready to receive a potential probe response message until a probe response message is received.

SOME EXAMPLE EMBODIMENTS

Therefore, there is a need for an approach for controlling the reception of a probe response message.

According to one embodiment, a method comprises causing, at least in part, an active scan process that includes transmitting one or more probe request messages to indicate one or more scheduling windows within which receiving one or more probe response messages is permitted in reply to the one or more probe request messages.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, an active scan process that includes transmitting one or more probe request messages to indicate one or more scheduling windows within which receiving one or more probe response messages is permitted in reply to the one or more probe request messages.

According to another embodiment, a computer-readable storage medium carries one or more sequences of one or more instructions which, when executed by one or more processors, cause, at least in part, an apparatus to cause, at least in part, an active scan process that includes transmitting one or more probe request messages to indicate one or more scheduling windows within which receiving one or more probe response messages is permitted in reply to the one or more probe request messages.

Exemplary embodiments are described herein. It is envisioned, however, that any system that incorporates features of any apparatus, method and/or system described herein are encompassed by the scope and spirit of the exemplary embodiments.

BRIEF DESCRIPTION OF THE DRAWINGS

The embodiments are illustrated by way of example, and not by way of limitation, in the figures of the accompanying drawings.

DESCRIPTION OF SOME EMBODIMENTS

Examples of a method, apparatus, and computer program for controlling the reception of a probe response message are disclosed. In the following description, for the purposes of explanation, numerous specific details are set forth in order to provide a thorough understanding of the embodiments. It is apparent, however, to one skilled in the art that the embodiments may be practiced without these specific details or with an equivalent arrangement. In other instances, well-known structures and devices are shown in block diagram form in order to avoid unnecessarily obscuring the embodiments.

References to "one embodiment," "an embodiment," "example embodiment," "various embodiments," etc., indicate that the embodiment(s) so described may include a particular feature, structure, or characteristic. Further, repeated uses of the phrase "in one embodiments" does not necessarily refer to the same embodiment, although it may.

As used herein, unless otherwise specified, the use of ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

As used herein, the term wireless network access point refers to any wireless network access point, station, user equipment, mobile device, soft access point, soft station, soft user equipment, etc. that may be configured to transmit a wireless signal.

As used herein, the term beacon, or any derivation thereof, refers to one or more signalling frames (i.e. management, control or extended control frames) that are periodically transmitted to announce the presence of a wireless network access point with which the beacon is associated and provide information about the associated wireless network access point.

Figure 1:
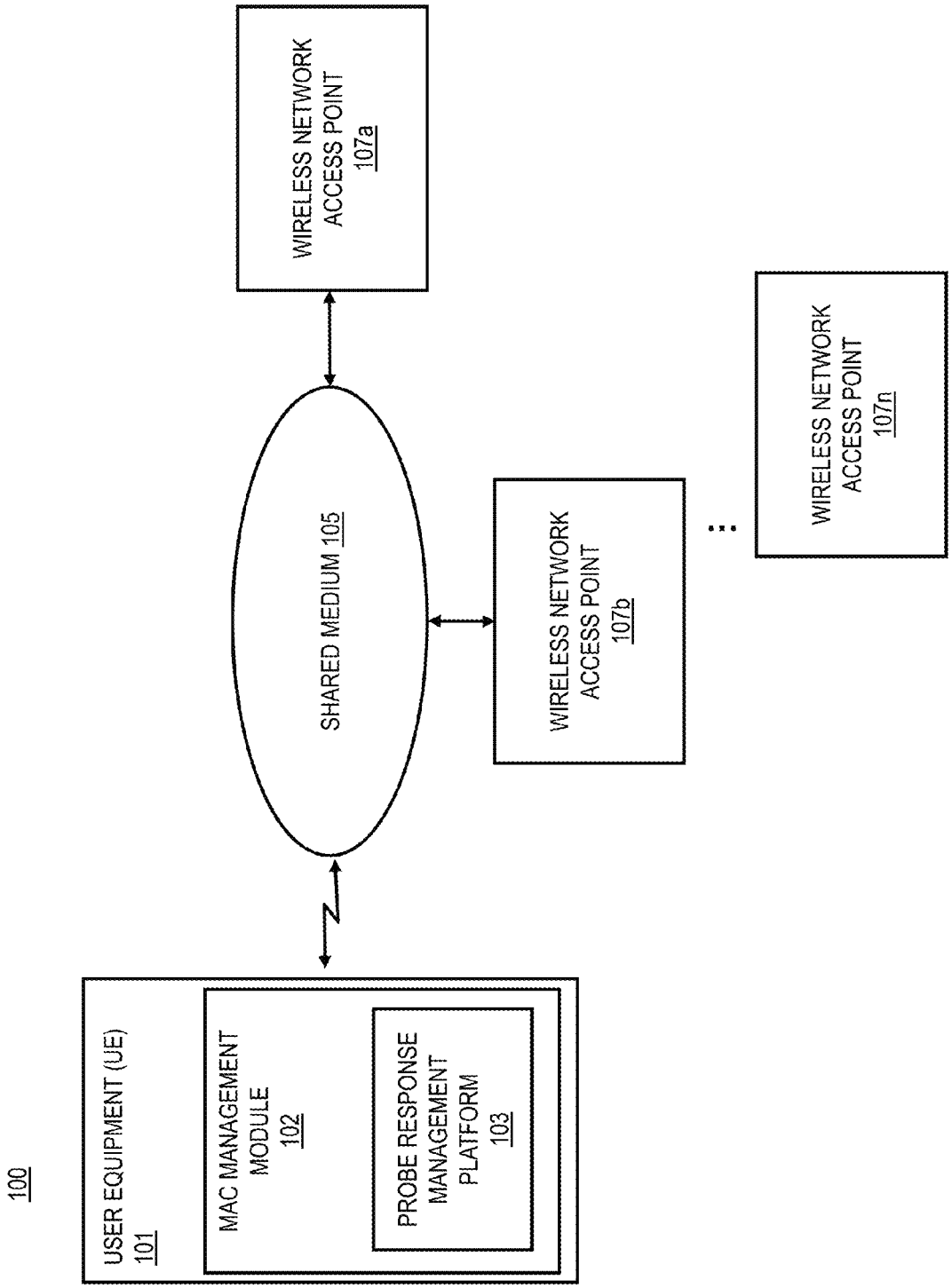
FIG. 1 is a diagram of a system capable of controlling the reception of a probe response message, according to one embodiment.

FIG. 1 is a diagram of a system 100 capable of controlling the reception of a probe response message, according to one embodiment.

The number of mobile devices incorporating IEEE 802.11 compliant capabilities is steadily growing. Applications that are continuously running on those devices benefit from the high data rates of the IEEE 802.11 interface. Mobile device users are constantly entering and leaving various coverage areas of an extended service set, for example. Every time the mobile device enters an extended service set, the mobile device has to do an initial link setup to establish wireless network connectivity. Wireless networks, such as those specified by various IEEE 802.11 standards for example, employ links between devices to communicate information. As such, procedures involving the initial setup of these links are important to such wireless networks. Efficient initial link setup, which may also be labeled "Fast Initial Link Setup" as discussed, for example, in the Fast Initial Link Setup Task Group 802.11ai PAR document (IEEE 802.11-10/1152r1, published September 2010), among others.

Mobile devices often transmit probe request messages in search of wireless network access points with which the mobile device may communicate. Wireless network access points that receive the probe request message may process the probe request message, generate a probe response message in reply to the probe request message, and transmit the probe response message to the requesting mobile device.

The sending and receiving of probe request message and response messages require a minimum distributed coordination function inter-frame space ("DIFS") per wireless medium arbitration. After the DIFS, a wireless network access point that receives a probe request message is able to transmit a probe response message.

However, differences among various wireless network access point products such as wireless network access point capabilities, processing power, system architecture, deployment locations, etc. result in differing processing times of received probe request messages, as well as process times for constructing a probe response message. Additionally, process time variations may occur because of the complexity of a probe request message, for example, and/or the timing of a probe request message (e.g. if a shared wireless medium is experiencing high volume).

These varying processing times result in different and often unpredictable reply times. For example, the need to process the probe request message content at the wireless network access point creates an inherent delay, and no conventional wireless network access point is able to respond within DIFS (28-50 µsec). Rather, conventional wireless network access points, average response times are about 2 msec, which is long and often an inconsistent duration. To accommodate unknown and/or long reply times, a mobile device must remain in an active reception state. In the active reception state, the mobile device keeps a receive channel open while the device waits to receive a probe response message. The receive channel often remains open for a time that complies with the slowest of wireless network access points. Keeping the receive channel open causes the mobile device to waste power and ultimately have a shorter battery life. In many cases, the mobile device has limited or no prior knowledge as to the existence and operational parameters of an available wireless network access point (e.g., an operating channel, SSID, access point capabilities, etc.), thereby requiring the mobile device to attempt probing and/or sampling receptions of probe response messages multiple channels periodically with which a wireless network access point may be associated. Such a procedure increases the amount of energy consumed by a mobile device over time. For example, as this exercise is not a singular event, the amount of energy consumed by the device per attempt may be quantified by multiplying the energy consumption by the attempt rate.

To address this problem, the system 100 of FIG. 1 introduces the capability to control the reception of a probe response message. As shown in FIG. 1, the system 100 comprises a user equipment (UE) 101 that includes a MAC management module 102 that is configured to control a probe response management platform 103. The system 100 also comprises one or more wireless network access points 107a-107n (collectively referred to as wireless network access point 107). The UE 101 and the wireless network access points 107 have connectivity to one another via a shared medium 105.

According to various embodiments, the probe response management platform 103 is configured to one or more of reduce the amount of time a UE 101 takes to discover a wireless network access point 107 with which the UE 101 was not previously associated (or with which a previous association was erased from a the UE 101), reduce the amount of power consumed while performing and maintaining a scan process for wireless network access point 107 discovery, and reduce shared medium occupancy to support the UE 101's network entry procedures (e.g. association) and service discovery.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

According to various embodiments, the probe response management platform 103 causes a probe request message to be transmitted over the shared medium 105. The probe request message includes an indication of a scheduling window having boundaries within which a probe response message generated by an available wireless network access point 107 can be received by the UE 101. The scheduling window, in some embodiments, may be set to occur at a specified time offset. The wireless network access point 107, accordingly, can transmit its probe response message in reply to the probe request message so that the probe response message is received by the UE 101 after the designated time offset within the indicated scheduling window. In some embodiments, the probe request message may include an earliest timing that a UE 101 will be able to receive a probe response message from an available wireless network access point 107 without an upper bound of the scheduling window.

Such a time offset of the scheduling window enables multiple probe request messages to be transmitted by the UE 101 over multiple channels (whether partially overlapping or not) and staggered. By offsetting a time period within which a probe response message may be received to a specifically predetermined period such as the indicated scheduling window, the probe response management platform 103 can cause the UE 101 to be in a probe response reception state for a specific time corresponding to the scheduling window. By only having the UE 101 in the reception state for a time corresponding to the scheduling window, power usage by the UE 101 can be reduced and battery life, for example, can be more efficiently managed.

In embodiments, for example, the probe response management platform 103 may be configured to transmit one or more probe request messages on one or more separate channels and cause each of the one or more probe request messages to indicate one or more respective scheduling windows that correspond with each of the one or more probe request messages on a same channel that each of the one or more probe request messages was separately transmitted on.

For example, if an equal number of scheduling windows and probe request messages are to occur, the probe response management platform 103 causes one or more probe request messages to be transmitted by the UE 101 that include corresponding probe response scheduling window indications. The probe response management platform 103 causes the UE 101 to transmit the one or more probe request messages on one or more channels such as, for example, channel N, channel N+1, channel N+2, etc. The channels on which the one or more probe request messages are transmitted may or may be adjacent to one another in the frequency domain, and the indicated one or more scheduling windows are set to occur on channels N, N+1 and N+2.

In some embodiments, the one or more scheduling windows may be staggered to occur at different times so that a potential probe response message that is in reply to a specific probe request message may be received in a scheduling window associated with a particular probe request message. Alternatively, the one or more scheduling windows may be ganged together to occur at a same time at the same particular channel no matter on what channel or at what time a probe request message is transmitted.

For example, the one or more respective scheduling windows may be indicated as occurring on a same or different channel as the corresponding probe request messages that were transmitted. In such a case, a receiving wireless network access point 107 may be caused to transmit a probe response message in accordance with instructions for a particular scheduling window that is associated with a received probe request message. That is, if a probe request message is transmitted in channel N, but the probe request message indicates that the scheduling window is to occur in channel N+2, the receiving wireless network access point 107 is caused to follow instructions in the received probe request message and transmit its probe response message in channel N+2 so that the probe response message is received by the UE 101 within the indicated scheduling window on the instructed channel.

Accordingly, the one or more respective scheduling windows may be provided to occur on a 1:1 basis with each probe request message on a same or different channel as the probe request message such that there is an equal number of scheduling windows and probe request messages. Or, the one or more respective scheduling windows may be ganged together on at least one same channel, or at least at a same time on varying channels so there are fewer scheduling windows than transmitted probe request messages. In embodiments, the UE 101 may be caused to transmit probe request messages in a sequential fashion, i.e. one after the other, and the scheduling window may be designated to occur after a particular number of transmitted probe request messages rather than following every individual transmitted probe request message.

For example, the probe response management platform 103 may cause any number of combinations of sequential probe request messages and subsequent scheduling that are indicated in the transmitted probe request message that may be associated with a set of probe request messages. For example, two probe request messages may be transmitted, followed by a scheduling window, then four probe request messages may be transmitted, followed by a scheduling, etc. Alternatively, the probe response management platform 103 could randomly assign intervals for the number of consecutive probe request messages that are transmitted before a scheduling window is scheduled to occur as indicated in the probe request messages.

Or, for example, the probe response management platform 103 may cause, at least in part, two or more probe requests to be transmitted indicating one scheduling window having a reception period in which a probe response message in reply to one or more of the two probe request messages may be received. As such, a wireless network access point 107 receiving a probe request message having such a scheduling window indication may transmit a requisite probe response message so that the transmitted probe response is received in the indicated reception period.

The probe request messages are transmitted by the UE 101 such that the transmission time is of a minimum duration to reduce transmitter and wireless medium usage and, depending on a UE 101's transmitting capability, the transmission times may even completely or partially overlap. Each probe request message includes a scheduling window within which a probe response message transmission associated with the probe request message may be received. In embodiments, the scheduling windows are staggered such that the probe response management platform 103 is able to switch the UE 101 to the reception state at the appropriate time to receive a potential probe response message transmitted by an available wireless network access point 107.

Wireless network access points 107 of varying types typically have a time period associated with constructing a probe response message. But, because the probe request message indicates a scheduling window during which a probe response message may be received by the UE 101, this time period associated with constructing a probe response message in not included in the amount of time that the UE 101 must be in an active reception state. As such, instructing the wireless network access point 107 to transmit a probe response message at a particular time enables a predictable reception duration because the UE 101 need only be in the reception state during the indicated scheduling window. By limiting the amount of time the UE 101 is in the reception state power consumption can be more efficiently managed and overall power usage by the UE 101 can be reduced compared to excessively long periods of being in a reception state.

According to various embodiments, if a probe response message is identified by the probe response management platform 103 as being received by the UE 101, the probe response management platform 103 may additionally cause the UE 101 to transmit one or more of a cancellation message, acknowledgment message, and request for association message to prevent wasteful usage of wireless medium because the responding wireless network access point 107 may continue to transmit a generated probe response message until such a cancellation, acknowledgment or request for association message is received.

In some embodiments, the probe response management platform 103 may encounter wireless network access points 107 that support multiple radio frequency channels. Some enterprise class wireless network access points 107 support multiple radio frequency channel and multiple medium access control ("MAC") instances, or multiple channels over multiple bands, concurrently with each instance of the MAC operating as a standalone process. The multiple channel support over multiple bands or in multiple MAC instances accommodates a common interference problem. Usually multiple channel support over a single band is problematic because it creates interference from one channel to another even when the channels are not adjacent because of a particular wireless network access point 107's form and antenna coupling. The implementation of multiple 802.11MACs in a single wireless network access point 107 package, however, enables the wireless network access point 107 a much higher management level as any underlying hardware running the multiple MAC capability is shared by the same wireless network access point 107, thus enabling a tighter level of coordination by the wireless network access point 107.

To accommodate this multi-MAC instance feature that some wireless network access points 107 have, the probe response management platform 103 is configured to include a set of information in a transmitted probe request message that enables a probe response message to be transmitted in case that a wireless network access point 107 supports multiple MAC instances or not. For example, the probe response management platform 103 may cause a probe request message to indicate one or more scheduling windows each associated with a specific reply channel. In this example, a wireless network access point 107 that supports multiple channels receives such a probe request message from the UE 101 as instructed by the probe response management platform 103. The wireless network access point 107 replies with a probe response message over one or more of the supported channels and associates the probe response message with the original probe request message indicating the channel on which the probe request message was received. The probe response message is periodically transmitted, or the wireless network access point 107 remains in a reception mode until an appropriate acknowledgement message is received, or at least until a maximum number of transmission attempts is exhausted. While in this reception state awaiting an acknowledgement message, the wireless network access point 107 may be able to receive a message on multiple channels. Alternatively, the wireless network access point may be caused to cycle through available channels so as to have a periodic reception period on each of the channels over which the probe response was transmitted.

For example, a UE 101 may be caused to transmit multiple probe request messages by the probe response management platform 103 that all indicate a single scheduling window and/or channel that the UE 101 will be enabled to receive a corresponding probe response message. A wireless network access point 107 identifies the probe request message and transmits a probe response message in accordance with the probe request message instructions over the channel defined in the probe request message such that the UE 101 receives the probe response message during the scheduling window defined by the probe request message. The probe response message, in this example, indicates its association with the transmitting wireless network access point 107 (e.g. channel SSID) and to the channel that the transmitting wireless network access point 107 is operating on (e.g. the channel on which the probe response message was received by the wireless network access point 107. The probe response management platform 103 then causes the UE 101 to turn to the channel on which the transmitting wireless network access point 107 is operating and to one or more of identify a beacon and transmit an association request message to the wireless network access point 107.

If the wireless network access point 107 supports multiple MAC instances, and the scheduling window and/or channel domain is covered or being used by another MAC instance of the same wireless network access point 107, the probe response message may be instructed by the probe response management platform 103 by way of instructions indicated in the probe response message, for example, to be transmitted over another channel by another MAC instance while the transmitting MAC continues without interference over the initial channel associated with the reception of the probe request message at the wireless network access point 107 based, at least in part, on an instruction included in the probe request message that accommodates multiple MAC instance capabilities. If the wireless network access point 107 supports only a single channel, or the channel defined by the scheduling window and/or channel domain is not supported or is being used by another MAC instance of the wireless network access point 107, for example, the wireless network access point 107 may abstain from its operating channel for a time period that is necessary to transmit the probe response message in reply to the received probe request message and receive an appropriate acknowledgment message, but no longer than the defined scheduling indicated in the probe request message transmitted by the UE 101 as instructed by the probe response management platform 103. In such a case, to prevent data loss, the wireless network access point 107 may be caused to indicate to any UE 101's that may already be in communication with the wireless network access point 107 that the wireless network access point 107 is about to switch channels and momentarily halt communications on its operating channel. This indication may occur, for example, shortly before switching channels to transmit the probe response message. A UE 101 that receives this message could be configured to account for such a warning, or it could simply ignore the warning. Alternatively, the wireless network access point 107 could be configured to switch channels momentarily without notifying any previously associated UE 101's.

According to various embodiments, as discussed above, and to facilitate multi-MAC instance capabilities, the probe response management platform 103 may be configured to cause the UE 101 to transmit two or more probe request messages indicating two or more scheduling windows that partially or completely overlap in time and/or frequency. The probe response management platform 103 may also cause the probe request message to indicate a scheduling window that occurs on a particular channel. For example, the probe response management platform 103 may cause the UE 101 to transmit a probe request message on a first channel but indicate in the probe request message that the scheduling window is in a channel other than the first channel. In other words, the wireless network access point 107 receives a probe request message on the first channel, but transmits based on an instruction indicated in the probe request message, its probe response message in a second channel.

In some embodiments, a wireless network access point 107 may receive at least two probe request messages in two or more separated channels because they are transmitted in those channels by the UE 101 as instructed by the probe response management platform 103. In this case, the wireless network access point 107 may transmit a probe response message in reply to at least one of the received probe request messages in a channel that is different than a channel in which the at least two probe request messages were received. For example, to reduce wireless medium usage, if a wireless network access point supports multi-MAC instances, and receives multiple probe request messages on multiple channels, the wireless network access point 107 may consolidate its probe response messages into a single probe response message and reply on any channel in during any scheduling window as instructed by the probe response management platform 103.

According to various embodiments, the probe response management platform 103 causes the probe request message to instruct the wireless network access point 107 to indicate in its probe response message the channel that the probe request message was transmitted over and successfully received by the wireless network access point and/or the channel on which to have the UE 101 transmit an association request to the wireless network access point 107. The probe response message may also be caused to include a beacon schedule on which that the wireless network access point 107 transmits a beacon. The inclusion of the beacon schedule in the probe response message may be in accordance with an instruction included in the probe request message generated by the probe response management platform 103. In some embodiments, the beacon schedule may indicate a beacon schedule that occurs in one or more channels that are the same, or other than, a channel that the probe response message is transmitted on. According to various embodiments, a channel that the probe request message is transmitted on may be caused to be included in the probe request message and/or the probe response message, and/or the channel may be preset based, at least in part, on a pre-agreed communication standard, regardless of whether that channel resulted in a successful reception of a probe request message by the wireless network access point 107 or not.

By way of example, the shared medium 105 of system 100 includes any communication medium available by way of, for example, one or more networks such as a wired data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiGig, wireless LAN (WLAN), Bluetooth®, Internet Protocol (IP) data casting, satellite, mobile ad-hoc network (MANET), and the like, or any combination thereof.

The UE 101, probe response management platform 103 and wireless network access point 107 may communicate with each other and other components of the shared medium 105 using well known, new or still developing protocols. In this context, a protocol includes a set of rules defining how the network nodes within the shared medium 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
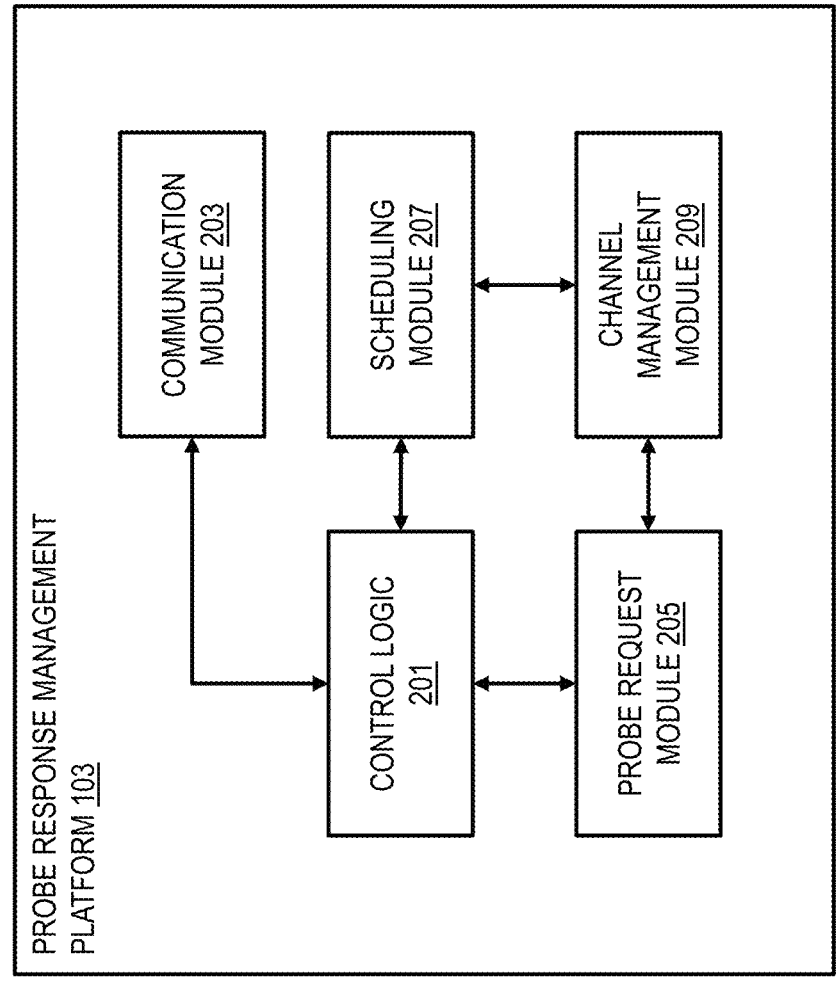
FIG. 2 is a diagram of the components of a probe response management platform, according to one embodiment.

FIG. 2 is a diagram of the components of the probe response management platform 103, according to one embodiment. By way of example, the probe response management platform 103 includes one or more components for controlling the reception of a probe response message. It is contemplated that the functions of these components may be combined in one or more components or performed by other components of equivalent functionality. In this embodiment, the probe response management platform 103 includes a control logic 201, a communication module 203, a probe request module 205, a scheduling module 207, and a channel management module 209. According to various embodiments, the probe response management platform 103 communicates with one or more of the UE 101 and a wireless network access point 107 by way of the communication module 203. The probe response management platform 103 causes a UE 101 to transmit one or more probe request messages in search of one or more available wireless network access points 107 during an active scan session.

To conserve power, and to reduce wireless medium usage, the control logic 201 instructs the probe request module 205 to consult the scheduling module 207 to optimize the scheduling of one or more probe request messages that the UE 101 will transmit to reduce wireless medium usage and to limit extraneous transmission times or states that may consume power. The probe request module 205 also consults with the scheduling module 207 to optimally schedule one or more scheduling windows so that the probe request module 205 includes an indication of the one or more scheduling windows during which the UE 101 is configured to receive a potential probe response message that an available wireless network access point 107 may transmit in reply to a received probe request message.

Depending on wireless capabilities of the UE 101 and/or wireless network access point 107 that may be commonly associated with a particular geographic area, for example, the control logic 201 may instruct the probe request module 205 to also consult the channel management module 209 to determine on which possible frequency channels a probe request message should be transmitted, and when. Once the probe request module 205 compiles the necessary information to determine which channels a probe request message should be transmitted on, and approximately what times a probe response should be received, the probe request module 205 constructs one or more probe request messages that are to be transmitted by the UE 101. Alternatively, the probe request messages may be transmitted on any channel, group of channels, random channels, any preset channels, or any combination thereof to best optimize the possibility of discovering an available wireless network access point 107 while limiting power consumption and wireless medium usage. The control logic 201 then instructs the communication module 203 to send the constructed probe request messages to the UE 101 for transmission.

If a wireless network access point 107 receives a probe request message, the wireless network access point 107, based on information and instructions included in the probe request message constructed by the probe request module 205, may include any of a channel on which the probe request message was received, a beacon schedule of the wireless network access point 107, capability information of the wireless network access point 107, or other information associated with the wireless network access point 107 with a probe response message constructed by the wireless network access point 107 and transmit that probe response message in accordance with the scheduling information included in the probe request message.

Upon receipt of the probe response message, the UE 101 communicates the probe response message to the probe response management platform 103 by way of the communication module 203 for processing. The control logic 201 may then cause the UE 101 to send an acknowledgement message to the wireless network access point 107 and/or a request for association message to the wireless network access point 107 to request connectivity with the wireless network access point 107. The instruction to send the acknowledgement and/or request for association message may be communication to the UE 101 by way of the communication module 203, for example.

Figure 3:
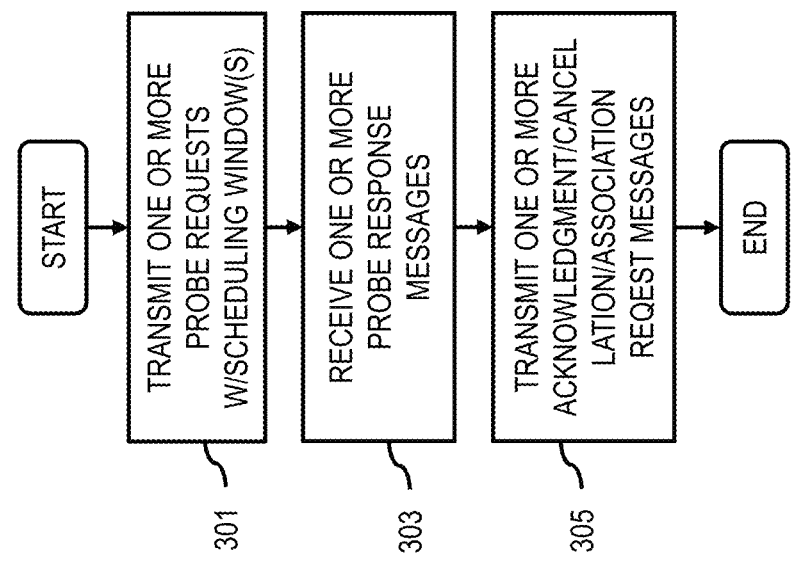
FIG. 3 is a flowchart of a process for controlling the reception of a probe response message, according to one embodiment.
Figure 7:
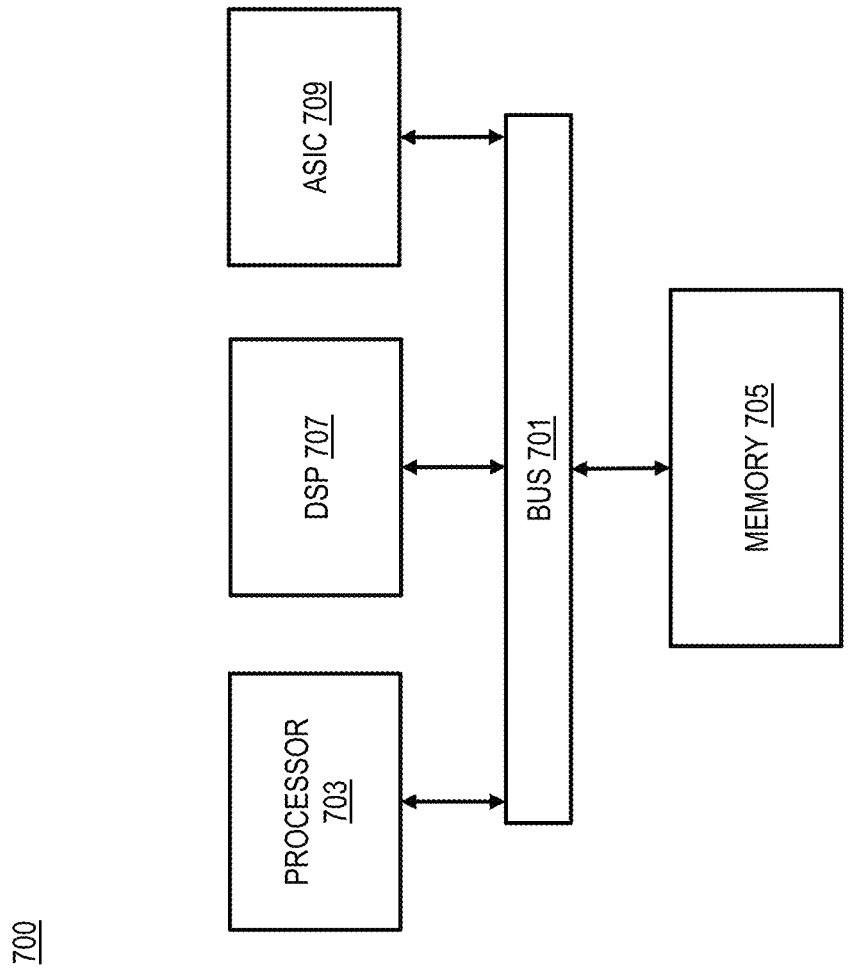
FIG. 7 is a diagram of a chip set that can be used to implement an embodiment.

FIG. 3 is a flowchart of a process for controlling the reception of a probe response message, according to one embodiment. In one embodiment, the probe response management platform performs the process 300 and is implemented in, for instance, a chip set including a processor and a memory as shown in FIG. 7. In step 301, probe response management platform 103 causes, at least in part, the UE 101 to perform an active scan process that includes transmitting one or more probe request messages to indicate one or more scheduling windows within which receiving one or more probe response messages is permitted in reply to the one or more probe request messages.

According to various embodiments, as discussed above, the probe response management platform 103 may cause two or more probe request messages to be transmitted in sequence, or any number of probe request messages to be transmitted and accordingly cause at least one of the one or more scheduling windows to occur at a time after the two or more probe request messages are transmitted in sequence, for example. In some embodiments, the probe response management platform 103 causes, at least in part, the one or more scheduling windows to indicate that a reception of the one or more probe response messages is permitted to occur at a time following selected transmissions of the one or more probe request messages. For example, the selected transmissions could be based on a preset preference, a preset interval, a preset probability, or on demand. In some embodiments, the probe response management platform 103 may cause, at least in part, an indication of an earliest timing that the one or more probe response messages can be received within the scheduling window.

In some embodiments, the probe response management platform 103 causes, at least in part, two or more probe request messages to be transmitted, the two or more probe request messages indicating two or more scheduling windows partially or completely overlap in one or more of time and frequency. Additionally, the probe response management platform 103 may further cause, at least in part, the one or more probe request messages to indicate a scheduling window in a channel different than a channel by which the one or more probe request messages are transmitted.

According to various embodiments, the probe response management platform 103 causes, at least in part, two or more probe request messages to be transmitted in two or more respectively separated channels. In some embodiments, the probe response management platform 103 may cause, at least in part, at least one probe response message to be received on a channel different from the two or more respectively separated channels.

In step 303, the probe response management platform 103 causes, at least in part, at least one of the one or more probe response messages to include the channel in which the probe request message is received by the receiving wireless network access point 107 confirming which transmitting channel was successful in reaching the wireless network access point 107.

In some embodiments, the probe response management platform 103 causes, at least in part, at least one of the one or more probe response messages to include a scheduling timing of a beacon in a channel other than the channel in which the at least one of the one or more probe request messages is received and the at least one of the one or more probe response messages is transmitted. Based on an instruction included in the probe request message and a determination that a wireless network access point 107 is not capable of supporting more than one MAC instance, the probe response management platform 103 causes, at least in part, the wireless network access point 107 to be absent from the channel with which the wireless network access point 107 is associated to cause, at least in part, the wireless network access point 107 to transmit at least one of the one or more probe response messages on a channel other than the channel with which the wireless network access point 107 is associated to enable the transmission of the one or more probe response messages and to await an appropriate acknowledgment message.

Then, in step 305, the UE 101 is caused to transmit one or more of an association request message, an acknowledgment message, and a cancellation message to the wireless network access point 107 upon receiving and processing a probe response message in reply to a probe request message.

Figure 4:
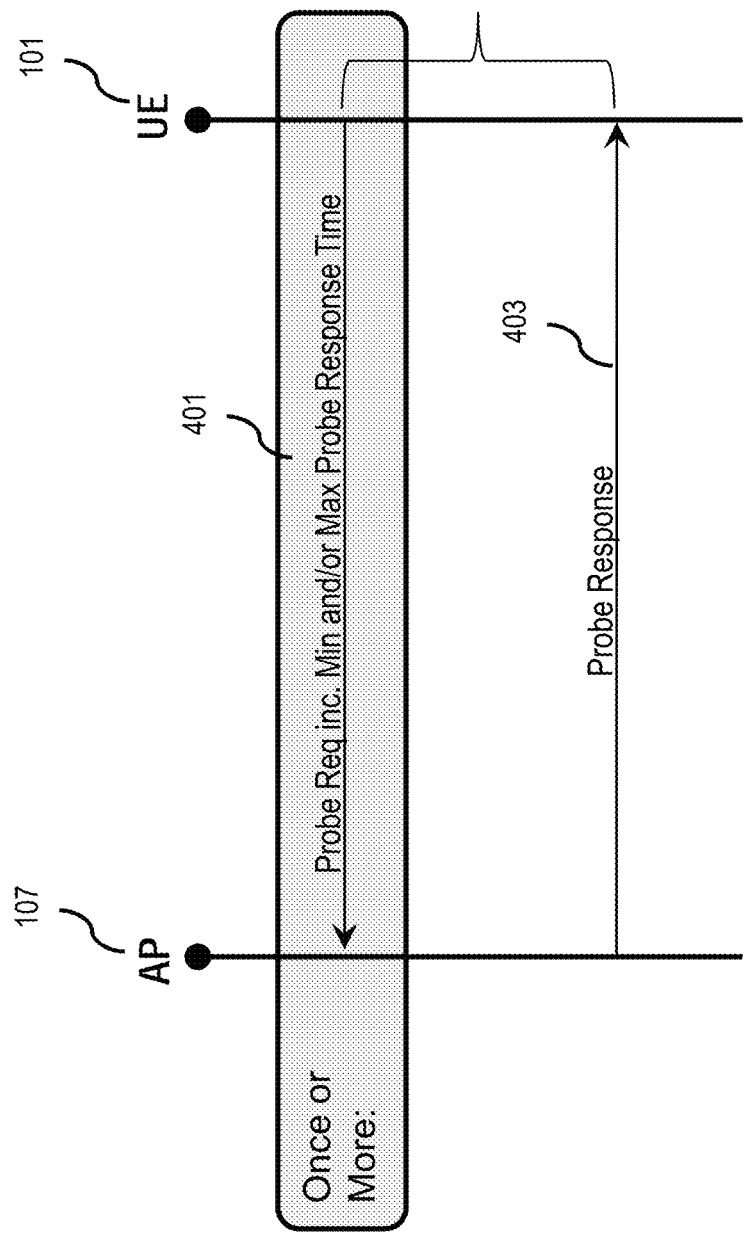
FIG. 4 is a process diagram of a set of probe request messages and probe response messages, according to one embodiment.

FIG. 4 is a process diagram 400 of a set of a transmitted and received probe request message 401 and a corresponding probe response message 403. In this example, a UE 101 transmits a probe request message 401 that is received by a wireless network access point 107. The probe request message 401 includes at least a minimum time after which the UE 101 is allowed to receive a probe response message 403. In some embodiments, the probe request message 401 may also include a maximum time after which the UE 101 is not allowed to receive the probe response message 403. The minimum and maximum times, together, may be considered as the boundaries for the scheduling window during which the UE 101 is allowed to receive a probe response message 403. The scheduling window may be one of many scheduling windows that can be indicated in one or more probe request messages 401.

Figure 5:
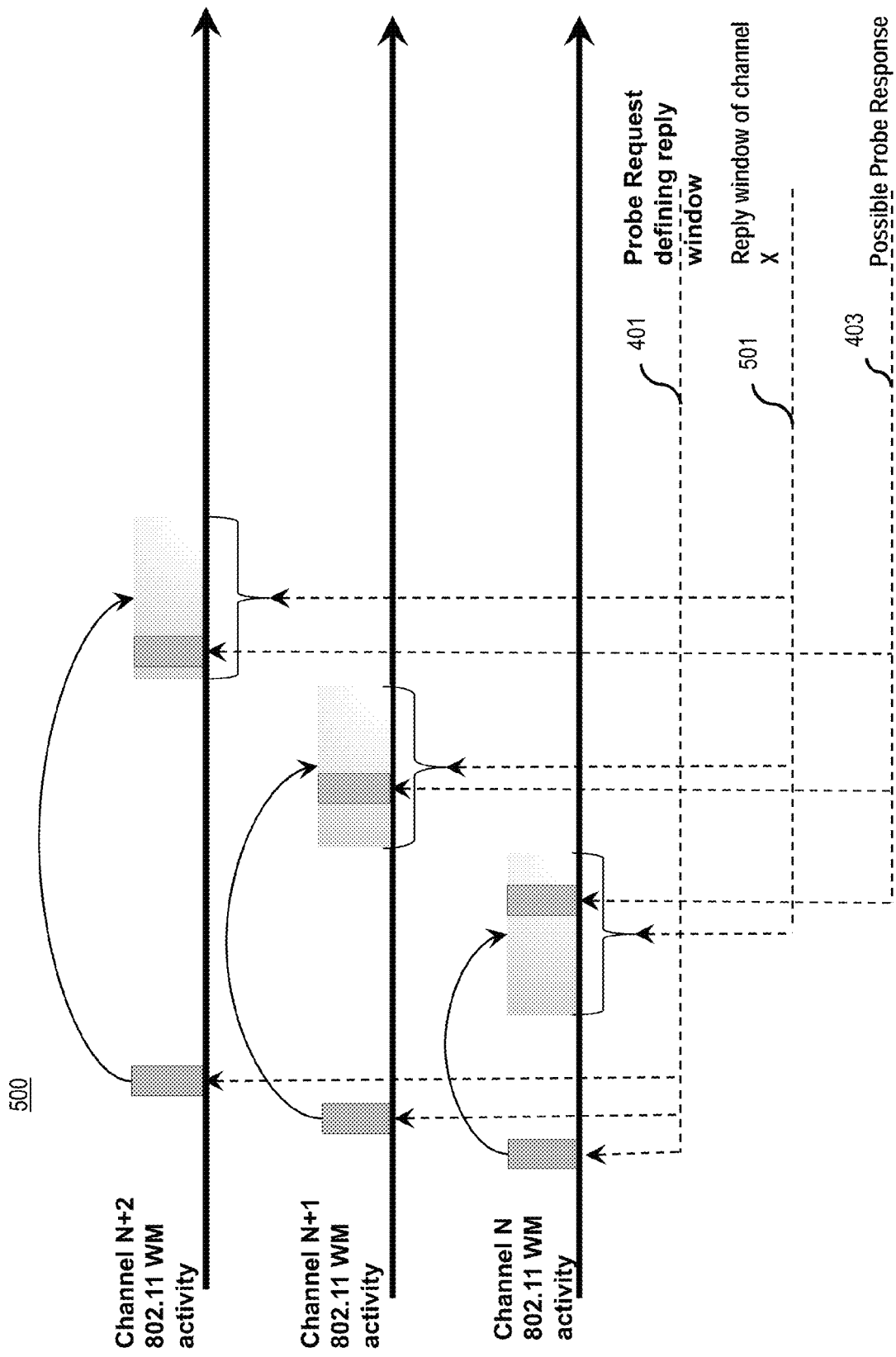
FIG. 5 is a process diagram of a series of staggered probe request messages and probe response messages, according to one embodiment.

FIG. 5 is a process diagram 500 of a series of staggered probe request messages 401 and probe response messages 403 according to one embodiment. The process diagram 500 illustrates various wireless medium activity in three example channels N, N+1 and N+2. It should be noted, however, that the probe response management platform 103, may be configured to cause transmission and reception of various messages on any number of channels. In this example, the UE 101, discussed above, is caused to have a probe response scheduling window indicated in the probe request message as instructed by the probe response management platform 103, discussed above.

The probe response management platform 103 causes the UE 101 to transmit multiple probe request messages 401 on multiple channels N, N+1 and N+2. In this example, channels N, N+1 and N+2 are not necessarily adjacent in the frequency domain. The probe request messages 401 are transmitted such that the a radio frequency transmission chain has a minimum duration of active time, e.g. a time corresponding to the scheduling window. Depending on the radio frequency transmission capability of a wireless network access point 107 and/or UE 101, a scheduling window may completely or partially overlap with other scheduling windows to reduce the overall time that a UE 101 is in a reception state.

Each probe request message 401 includes a scheduling window 501 within which the probe response message 403 may be received by UE 101. The scheduling windows 501, in this example, are staggered such that the UE 101 is able to switch to its reception state in time to receive a potential probe response message 403 that is transmitted in reply to the probe request messages 401. By scheduling the period during which a probe response message 403 can be received by the UE 101, the time associated with generating the probe response message 403 at the wireless network access point 107 may be ignored and the scheduling window 501 duration need not account for this time other than, perhaps, an earliest timing of entry into the scheduling window 501, for example. This enables the UE 101 to go into an inactive state, for example, resulting in a shorter overall reception state duration of the UE 101, thereby reducing overall device power consumption. If a probe response message 403 is identified by the probe response management platform 103, the UE 101 may be caused to additionally transmit a cancellation message or acknowledgement message 603 indicating the probe response message 403 has been received so as to prevent wasteful usage of the wireless medium associated with the UE 101 and/or the wireless network access point 107.

Figure 6:
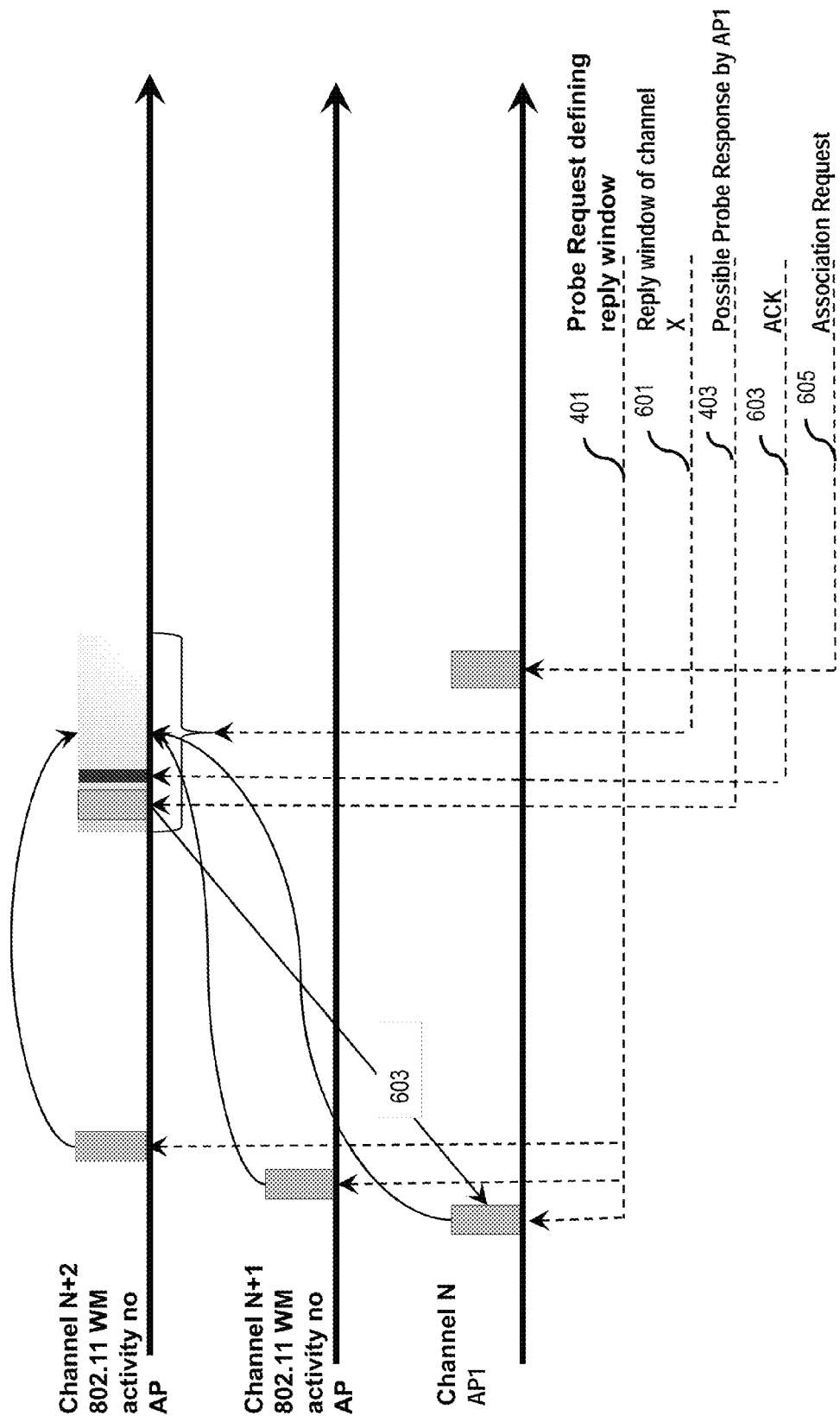
FIG. 6 is a process diagram of a series of probe request messages transmitted on multiple channels pointing to a single scheduling window, according to one embodiment.

FIG. 6 illustrates a process diagram 600 of a series of staggered probe request messages 401 in a case where a wireless network access point 107, as discussed above, is capable of supporting multiple MAC instances. In this example, a single scheduling window 601 is associated with a reply channel. A wireless network access point 107 that supports multiple channels receives a probe request message 401 and transmits a probe response message 403 in reply to the received probe request message 401 over one or more channels N, N+1 and N+2, for example. The probe response message 403 sent over one or more of the channels N, N+1 and N+2 may be continually transmitted until an appropriate acknowledgement or cancellation message is received by the wireless network access point 107.

In this example, multiple probe request messages 401 are illustrated as pointing to single scheduling window 601. The probe response management platform 103 causes a UE 101 to transmit multiple probe request messages 401 all of which point to a single scheduling window/channel domain. A wireless network access point 107 that receives one or more of the probe request messages 401 identifies the probe request and transmits a probe response message 403 over the channel that the probe request message 401 was received and/or during the scheduling window and on the channel domain defined in the probe request message 401 as instructed by the probe response management platform 103. In some embodiments, the probe response message 403 may indicate its association to the wireless network access point 107 that transmits the probe response message 403 (e.g. channel SSID) and may also associate the probe response message 403 with the specific probe request message 401 that the probe response message 403 is in reply to by way of an association indication 603 tag.

Upon receipt of the probe response message, the UE 101 may then turn to channel N, in this example, and identify a beacon and/or transmit an association request 605 to the wireless network access point 107 that transmits the probe response message 403. If the wireless network access point 107 supports multiple MAC instances, and the indicated scheduling window/channel domain is covered or is being used by another MAC instance of the same wireless network access point, the probe response message 403 may be transmitted over channel N+2 by another MAC instance while the transmitting MAC continues without interference over channel N. But, if the transmitting wireless network access point 107 only supports a single channel or the channel defined by the reception window/channel domain is not supported by another MAC instance of the wireless network access point 107, the wireless network access point 107 may abstain from its operating channel for a time necessary to transmit the probe response message 403 and receive a reply from a UE 101, for example. In some embodiments, the time for abstaining from an operating channel may be set to be no more than the scheduling window time period defined by the probe request message 401 so that the wireless network access point 107 may be available for network connection by the UE 101 or any other mobile devices for a maximum period of time.

The processes described herein for controlling the reception of a probe response message may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 7 illustrates a chip set or chip 700 upon which an embodiment may be implemented. Chip set 700 is programmed to controlling the reception of a probe response message as described herein may include, for example, bus 701, processor 703, memory 705, DSP 707 and ASIC 709 components.

The processor 703 and memory 705 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of controlling the reception of a probe response message.

In one or more embodiments, the chip set or chip 700 includes a communication mechanism such as bus 701 for passing information among the components of the chip set 700. Processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one or more embodiments, the processor (or multiple processors) 703 performs a set of operations on information as specified by computer program code related to controlling the reception of a probe response message. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 701 and placing information on the bus 701. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 703, such as a sequence of operation codes, constitute processor instructions, also called computer system instructions or, simply, computer instructions. Processors may be implemented as mechanical, electrical, magnetic, optical, chemical or quantum components, among others, alone or in combination.

The processor 703 and accompanying components have connectivity to the memory 705 via the bus 701. The memory 705 may include one or more of dynamic memory (e.g., RAM, magnetic disk, writable optical disk, etc.) and static memory (e.g., ROM, CD-ROM, etc.) for storing executable instructions that when executed perform the inventive steps described herein to controlling the reception of a probe response message. The memory 705 also stores the data associated with or generated by the execution of the inventive steps.

In one or more embodiments, the memory 705, such as a random access memory (RAM) or any other dynamic storage device, stores information including processor instructions for controlling the reception of a probe response message. Dynamic memory allows information stored therein to be changed by system 100. RAM allows a unit of information stored at a location called a memory address to be stored and retrieved independently of information at neighboring addresses. The memory 705 is also used by the processor 703 to store temporary values during execution of processor instructions. The memory 705 may also be a read only memory (ROM) or any other static storage device coupled to the bus 701 for storing static information, including instructions, that is not changed by the system 100. Some memory is composed of volatile storage that loses the information stored thereon when power is lost. The memory 705 may also be a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 703, including instructions for execution. Such a medium may take many forms, including, but not limited to computer-readable storage medium (e.g., non-volatile media, volatile media), and transmission media. Non-volatile media includes, for example, optical or magnetic disks. Volatile media include, for example, dynamic memory. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

While a number of embodiments and implementations have been described, the disclosure is not so limited but covers various obvious modifications and equivalent arrangements, which fall within the purview of the appended claims. Although features of various embodiments are expressed in certain combinations among the claims, it is contemplated that these features can be arranged in any combination and order.

What is claimed is:
1. A method comprising:
 causing, at least in part, an active scan process that includes transmitting one or more probe request messages to indicate one or more scheduling windows within which transmitting and receiving one or more probe response messages is permitted in reply to the one or more probe request messages;
 causing, at least in part, two or more probe request messages to be transmitted, the two or more probe request messages indicating two or more receive windows that partially or completely overlap in one or more of time and frequency; and causing, at least in part, the one or more probe request messages to indicate a scheduling window in a channel different than a channel on which the one or more probe request messages are transmitted.

2. The method of claim 1, further comprising:

causing, at least in part, two or more probe request messages to be transmitted in sequence over one or more channels.

3. The method of claim 2, further comprising:

causing, at least in part, at least one of the one or more scheduling windows to occur at a time after the two or more probe request messages are transmitted in sequence.

4. The method of claim 2, further comprising:

causing, at least in part, the one or more probe request messages to indicate reception of the one or more probe responses is permitted to occur at a time following selected transmissions of the one or more probe request messages.

5. The method of claim 1, further comprising:

causing, at least in part, an indication of an earliest timing that the one or more probe response messages can be received within the scheduling window.

6. The method of claim 1, further comprising:

causing, at least in part, two or more probe request messages to be transmitted in two or more respectively separated channels; and causing, at least in part, at least one probe response message to be received on a channel different from the two or more respectively separated channels.

7. The method of claim 1, further comprising:

causing, at least in part, at least one of the one or more probe response messages to indicate a channel on which a probe request message to which the at least one of the one or more probe response messages is in reply to was transmitted.

8. The method of claim 7, further comprising:

causing, at least in part, at least one of the one or more probe response messages to include a scheduling timing of a beacon in a channel other than the channel in which the at least one of the one or more probe request messages is transmitted and the at least one of the one or more probe response messages is transmitted.

9. The method of claim 1, further comprising:

causing, at least in part, a wireless network access point to be absent from a channel with which the wireless network access point is associated; and causing, at least in part, the wireless network access point to transmit at least one of the one or more probe response messages on a channel other than the channel with which the wireless network access point is associated.

10. An apparatus comprising:

at least one processor; and at least one memory including computer program code for one or more programs, the at least one memory and the computer program code configured to, with the at least one processor, cause the apparatus to perform at least the following, cause, at least in part, an active scan process that includes transmitting one or more probe request messages to indicate one or more scheduling windows within which transmitting and receiving one or more probe response messages is permitted in reply to the one or more probe request messages;

cause, at least in part, two or more probe request messages to be transmitted, the two or more probe request messages indicating two or more receive windows that partially or completely overlap in one or more of time and frequency; and cause, at least in part, the one or more probe request messages to indicate a scheduling window in a channel different than a channel on which the one or more probe request messages are transmitted.

11. The apparatus of claim 10, wherein the apparatus is further caused to:

cause, at least in part, two or more probe request messages to be transmitted in sequence over one or more channels.

12. The apparatus of claim 11, wherein the apparatus is further caused to:

cause, at least in part, at least one of the one or more scheduling windows to occur at a time after the two or more probe request messages are transmitted in sequence.

13. The apparatus of claim 11, wherein the apparatus is further caused to:

cause, at least in part, the one or more scheduling windows to indicate reception of the one or more probe responses is permitted to occur at a time following selected transmissions of the one or more probe request messages.

14. The apparatus of claim 10, wherein the apparatus is further caused to:

cause, at least in part, an indication of an earliest timing that the one or more probe response messages can be received within the scheduling window.

15. The apparatus of claim 10, wherein the apparatus is further caused to:

cause, at least in part, two or more probe request messages to be transmitted in two or more respectively separated channels; and cause, at least in part, at least one probe response message to be received on a channel different from the two or more respectively separated channels.

16. The apparatus of claim 10, wherein the apparatus is further caused to:

cause, at least in part, at least one of the one or more probe response messages to indicate a channel on which a probe request message to which the at least one of the one or more probe response messages is in reply to was transmitted.

17. The apparatus of claim 16, wherein the apparatus is further caused to:

cause, at least in part, at least one of the one or more probe response messages to include a scheduling timing of a beacon in a channel other than the channel in which the at least one of the one or more probe request messages is received and the at least one of the one or more probe response messages is transmitted.

18. The apparatus of claim 10, wherein the apparatus is further caused to:

cause, at least in part, a wireless network access point to be absent from a channel with which the wireless network access point is associated; and cause, at least in part, the wireless network access point to transmit at least one of the one or more probe response messages on a channel other than the channel with which the wireless network access point is associated.

19. A non-transitory computer-readable storage medium carrying one or more sequences of one or more instructions which, when executed by one or more processors, cause an apparatus to at least perform the following, cause, at least in part, an active scan process that includes transmitting one or more probe request messages to indicate one or more scheduling windows within which transmitting and receiving one or more probe response messages is permitted in reply to the one or more probe request messages;

cause, at least in part, two or more probe request messages to be transmitted, the two or more probe request messages indicating two or more receive windows that partially or completely overlap in one or more of time and frequency; and cause, at least in part, the one or more probe request messages to indicate a scheduling window in a channel different than a channel on which the one or more probe request messages are transmitted.

20. The non-transitory computer-readable storage medium of claim 19, wherein the apparatus is further caused to:
cause, at least in part, two or more probe request messages to be transmitted in sequence.

21. The non-transitory computer-readable storage medium of claim 20, wherein the apparatus is further caused to:
cause, at least in part, at least one of the one or more scheduling windows to occur at a time after the two or more probe request messages are transmitted in sequence over one or more channels.

22. The non-transitory computer-readable storage medium of claim 20, wherein the apparatus is further caused to:
cause, at least in part, the one or more scheduling windows to indicate reception of the one or more probe responses is permitted to occur at a time following selected transmissions of the one or more probe request messages.

23. The non-transitory computer-readable storage medium of claim 19, wherein the apparatus is further caused to:
cause, at least in part, an indication of an earliest timing that the one or more probe response messages can be received within the scheduling window.

24. The non-transitory computer-readable storage medium of claim 19, wherein the apparatus is further caused to:
cause, at least in part, two or more probe request messages to be transmitted in two or more respectively separated channels; and cause, at least in part, at least one probe response message to be received on a channel different from the two or more respectively separated channels.

25. The non-transitory computer-readable storage medium of claim 19, wherein the apparatus is further caused to:
cause, at least in part, at least one of the one or more probe response messages to indicate a channel on which a probe request message to which the at least one of the one or more probe response messages is in reply to was transmitted.

26. The non-transitory computer-readable storage medium of claim 25, wherein the apparatus is further caused to:
cause, at least in part, at least one of the one or more probe response messages to include a scheduling timing of a beacon in a channel other than the channel in which the at least one of the one or more probe request messages is transmitted and the at least one of the one or more probe response messages is transmitted.

27. The non-transitory computer-readable storage medium of claim 19, wherein the apparatus is further caused to:
cause, at least in part, a wireless network access point to be absent from a channel with which the wireless network access point is associated; and cause, at least in part, the wireless network access point to transmit at least one of the one or more probe response messages on a channel other than the channel with which the wireless network access point is associated.

* * * * *